Jan. 21, 1947. O. H. LUDEMAN 2,414,751
VALVE
Filed May 13, 1944 2 Sheets-Sheet 1
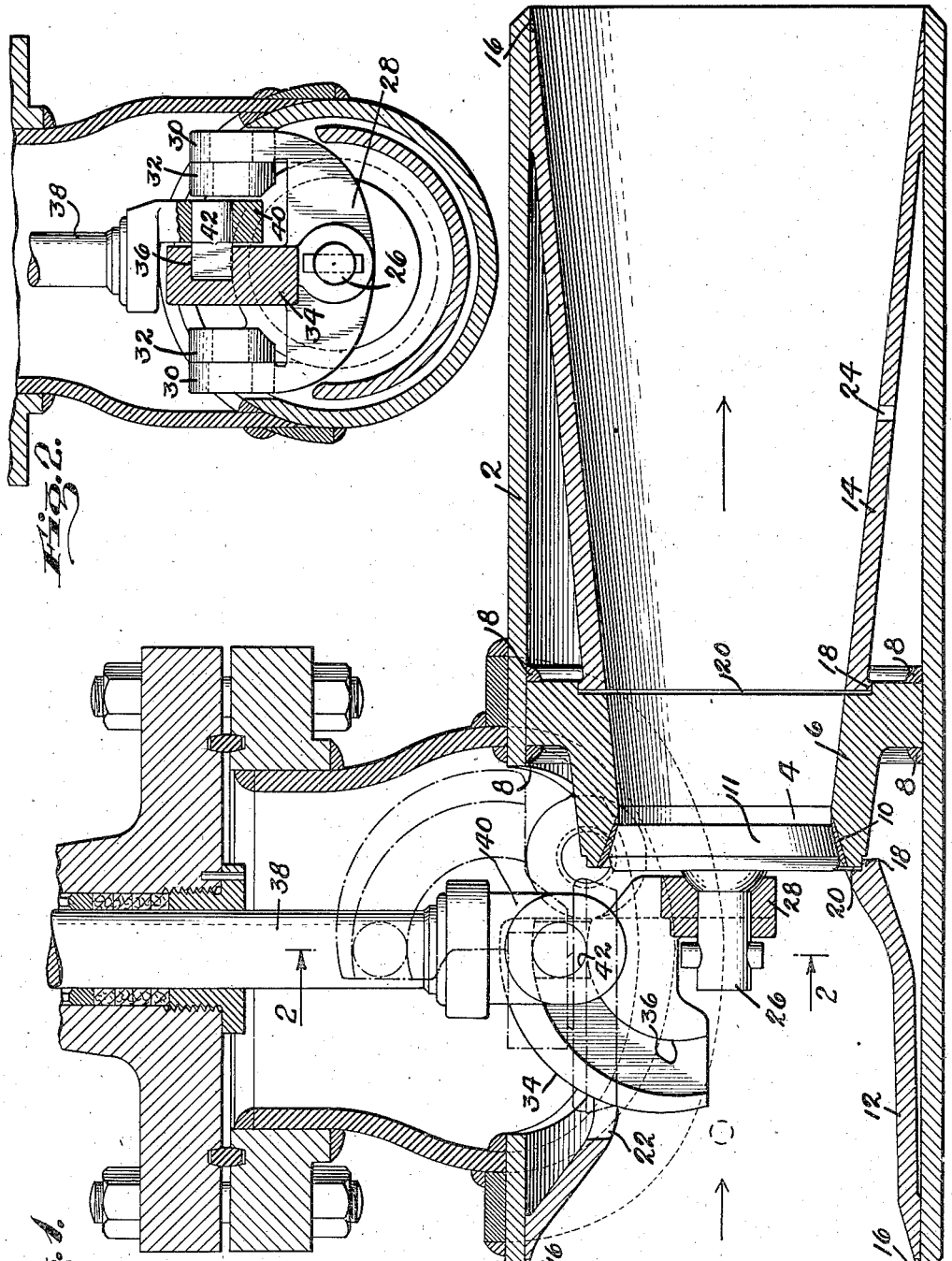
INVENTOR
Oscar H. Ludeman
BY James G. Bethell
ATTORNEY Jan. 21, 1947.  O. H. LUDEMAN  2,414,751
VALVE
Filed May 13, 1944  2 Sheets-Sheet 2
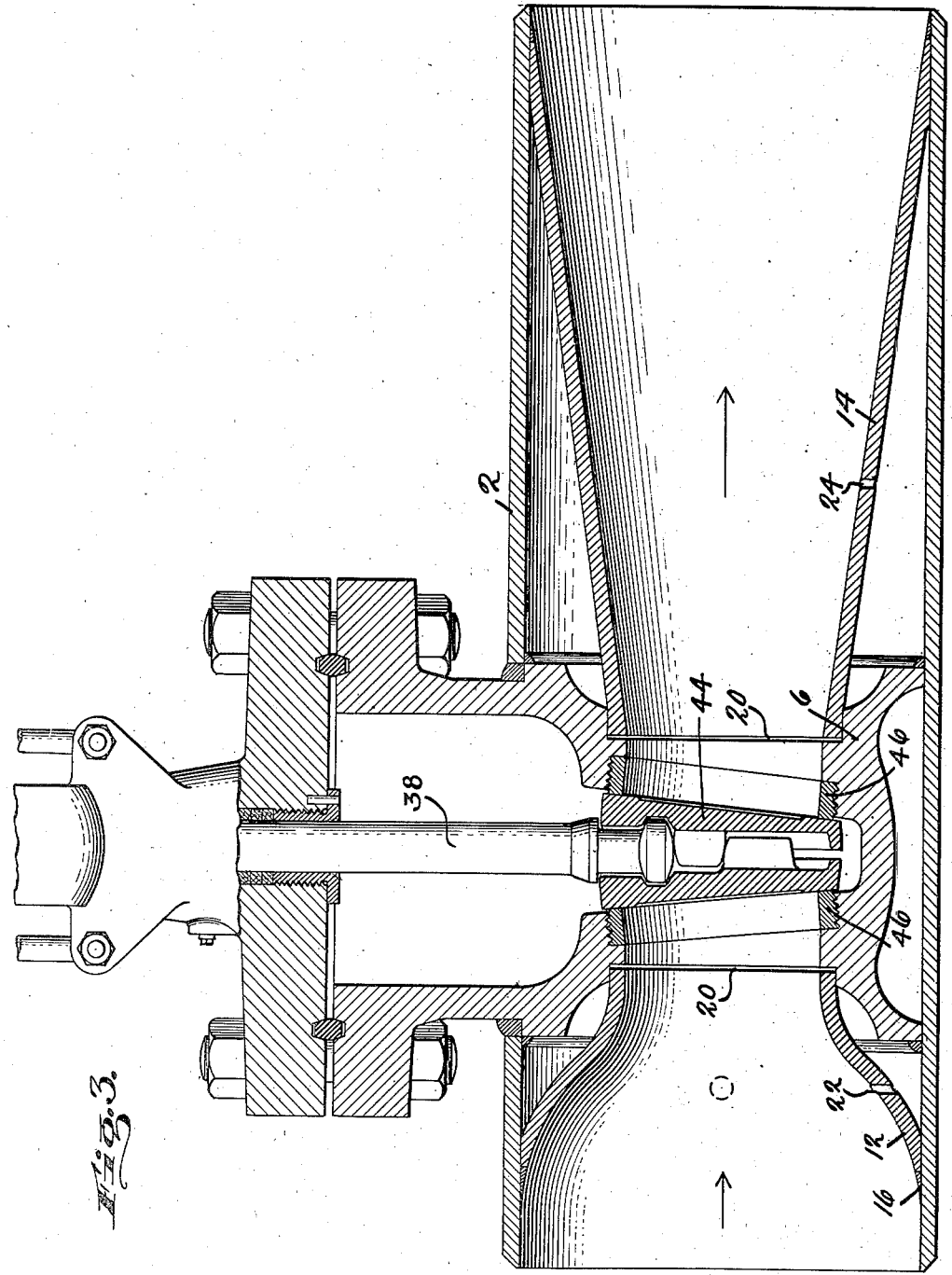
INVENTOR
Oscar H. Ludeman
BY
James G. Bethell
ATTORNEY Patented Jan. 21, 1947

2,414,751

UNITED STATES PATENT OFFICE 2,414,751

VALVE

Oscar H. Ludeman, New York, N. Y., assignor to Skinner Engine Company, Erie, Pa., a corporation of Pennsylvania Application May 13, 1944, Serial No. 535,410

7 Claims. (Cl. 251—155)

My invention is directed to an improvement in Venturi valves for handling steam and other fluids, and has for one of its objects to provide a valve which is of improved and novel construction.

Another object of my invention is to provide a construction in valves in which the weight for a given size or capacity has been reduced to a minimum.

A further object of my invention is to provide a valve construction which is particularly well adapted for carrying high temperature fluids without distortion and with the assurance that the valve will always properly seat.

Other and further advantages of my invention will be apparent from the detailed description which follows.

In the drawings:

Fig. 1, which is a fragmentary sectional elevational view, shows my invention as applied to a Venturi valve of the disc valve type;

Fig. 2 is a section on the line 2—2 of Fig. 1; and

Fig. 3 is a view similar to Fig. 1 showing my invention applied to a gate valve.

Referring to the drawings in detail and first of all to the embodiment of my invention as illustrated in Figs. 1 and 2: It will be seen that the conventional cast steel body has been replaced by an outer steel pipe shell 2 which takes all piping strains and carries the pressure load. In the illustration the shell 2 is designed for welding in the line.

4 designates the valve opening. This opening or port is provided in a heavy steel casting or fabricated piece 6 which is mounted within the shell 2 and is welded thereto as shown at 8. The valve seat 10 is integral with the member 6. The steel casting or fabricated piece 6 carries the valve disc 11, as will be brought out later, so that any pipe strain or distortion cannot be transmitted to the valve nor to its seat, and I am assured of proper seating of the valve on its seat at all times and under all conditions.

12 designates a fluid guide tube upstream from the valve opening, and 14 an outwardly tapered tube at the downstream side of the valve opening. Each of these tubes, which may be steel, is welded at its outer end, as shown at 16, within the steel pipe shell 2, while their inner ends, as shown at 18, are machined to rest upon—overlap—the steel casting or fabricated piece 6.

It is to be noted that clearance 20 is provided between the inner ends of the tubes 12 and 14 and the steel casting or fabricated piece 6 so as to allow for free expansion or contraction of these members without distortion.

Inasmuch as the guide piece 12 is provided in its wall with opening 22 and the wall of the tapered tube 14 with opening 24, these members are always in pressure balance and can be light in weight.

It is to be understood that if desired the tubes 12 and 14 may be anchored at their inner ends, and left floating at their outer ends, so as to be free to expand and contract without distortion and without distortion of the piece 6.

The upstream face of the valve 11 is provided with a projection or boss 26 which is perpendicular to the valve face, and receives a yoke 28 which extends transversely of the valve 11 beyond the sides thereof, substantially at right angles to the projection or boss 26. This yoke is provided with ears 30 adapted to be pivoted to ears 32 which are formed integral with the valve seat piece 6, thereby to mount the valve for pivotal movement toward and away from its seat. This arrangement provides, as will be seen, for mounting the valve on the piece 6 which also mounts the valve seat, this common support for valve and seat assuring proper seating of the valve at all times, which would not be true of course if the valve seat were provided in one member and the valve pivoted to another.

To effect pivotal movement of the valve the yoke 28 is provided with an integral rib 34 which projects outwardly from the face of the yoke at right angles to the axis of pivot of the valve itself. This rib is provided with an arcuate groove 36.

38 designates the stem of my improved valve. This stem, which for illustrative purposes has been shown as manually operated, is provided at its lower end with an extension 40 which lies beside the rib 34, as seen in Fig. 2, so that the two, the valve stem and rib 34, may be connected to each other by a pin 42 carried by extension 40, the end of this pin projecting into the groove 36 in rib 34.

As the valve stem 38 is raised and lowered the engagement of the pin 42 with the groove 36 will effect pivoting of the valve disc 11 to open and closed position.

It is to be noted that the groove 36 is rectangular in cross section, and the end of the pin 42 which projects into the groove is similarly shaped, thereby providing extended area bearing between the pin and groove. It is to be understood of course that the pin 42 is free to rock in the valve stem 38 as the valve is opened and closed.

It is to be noted that the yoke 28 is loosely connected to the valve 11 so as to permit of rotation of the valve disc and a certain amount of limited movement of the valve relatively to the disc, for the purpose of facilitating perfect seating of the valve.

From all of the foregoing it will be seen that I have provided a new and novel construction in valves in that I do away entirely with the heavy and massive cast steel body commonly employed in valves of this general type and have replaced the same with relatively light steel pipe. This and other novel features provided effect a tremendous saving in weight. For example, a ten inch valve built in accordance with this invention will weigh only approximately 600 lbs. as compared with 1800 to 2500 lbs. for a valve for the same size and pressures in conventional design.

It will be appreciated also that the valve seat piece 6 carries the valve and while this piece is welded to the steel pipe 2 constituting the valve body, and while the guide tube 12 and tapered tube 14 are welded to the valve body, yet distortion or movement of these tubes either in themselves or through shell 2 has no effect upon proper alignment of the valve and valve seat because of the clearance spaces 20 which I have provided between the tubes and the valve seat casting.

The embodiment of my invention as illustrated in Fig. 3 is similar in principle to the embodiment above described.

In Fig. 3 I have shown a gate valve instead of the disc valve of Fig. 1, the valve being designated 44. As in the construction of Fig. 1 the seat members 46 are carried by the valve seat piece 6 to which the steel pipe shell 2 constituting the valve body is welded.

It will be noted that in this embodiment of my invention clearance 20 has been provided between the valve seat casting 6 and guide tube 12 and tapered tube 14, so that deflection or elongation and contraction of tubes 12 and 14 will have no effect upon the valve seat thereby promoting proper seating of the gate at all times.

As pointed out in connection with the description of Fig. 1 the tubes 12 and 14 may be anchored at their inner ends and left floating at their outer ends to accomplish the same desired result.

It is to be understood that changes may be made in the details of construction and arrangement of parts shown and described within the purview of this invention.

What I claim is:

1. Valve mechanism comprising in combination a steel pipe valve body, a steel member carrying a valve seat within said pipe and secured to the pipe intermediate the ends thereof, a guide tube for fluid within said pipe at one side of the valve-seat-carrying member, a tube for fluid within the said pipe at the opposite side of said valve-seat-carrying member, said last-mentioned tube flaring outwardly, both of said tubes extending from the said valve-seat-carrying member toward the ends of the said pipe valve body, one end of each of said tubes being anchored to said pipe valve body while the other end is free to float to permit of contraction and expansion of the tubes without distortion of the valve-seat-carrying member.

2. Valve mechanism comprising in combination a steel pipe valve body, a steel member carrying a valve seat inserted in said pipe and secured thereto intermediate the ends thereof, a guide tube for fluid within said pipe body at one side of the valve-seat-carrying member, a tube within the said pipe body at the opposite side of said valve-seat-carrying member, said tubes extending from the said valve-seat-carrying member toward the ends of said pipe valve body, and means for mounting said tubes to anchor one end thereof relatively to the valve-seat-carrying member and the steel pipe valve body while leaving the other end free to float, thereby to permit of expansion and contraction of the tubes relatively to the valve-seat-carrying member and the steel pipe valve body.

3. Valve mechanism comprising in combination a steel pipe valve body, a steel member within said pipe and secured thereto, a valve seat carried thereby, a guide tube for fluid within said pipe body at one side of the valve seat, a tube within said pipe body at the other side of the valve seat and flaring outwardly therefrom, said tubes being aligned with said valve seat and extending therefrom toward the ends of the pipe valve body, and means for anchoring one end of each tube relatively to the steel pipe valve body and said steel member while leaving the other end free to float whereby said tubes may contract and expand without necessitating movement of the steel pipe valve body and the said steel member.

4. Valve mechanism comprising in combination a steel pipe valve body, a valve-seat-carrying member within said pipe and secured thereto, a guide tube for fluid at one side of the valve-seat-carrying member and a tube for fluid at the opposite side of said valve-seat-carrying member and flaring outwardly therefrom, said tubes being mounted within said steel pipe body and having their respective outer ends secured thereto, said tubes extending inwardly toward the valve-seat-carrying member to beyond the ends of said member, a clearance space being provided between the inner end of each tube and the valve-seat-carrying member, whereby contraction and elongation of the tubes is permitted without necessitating movement of the valve-seat-carrying member.

5. Valve mechanism comprising in combination a steel pipe valve body, a steel member providing a valve seat mounted within said pipe intermediate the ends thereof and rigidly secured thereto, a guide tube for fluid within said steel pipe at the upstream side of the valve seat, a tube within said steel pipe at the downstream side of the valve seat and flaring outwardly therefrom, said tubes extending from said valve seat toward the extremities of said valve body, and means anchoring one end of each of said tubes while leaving the opposite end free to float so that contraction and expansion of the tubes will not be transmitted to the valve body and said steel member.

6. Valve mechanism comprising in combination a steel pipe valve body, a steel member providing a valve seat mounted within said steel pipe and secured thereto, a guide tube for fluid and an outwardly flared tube within said steel pipe at opposite sides of said steel member, ports in said tubes to permit of the passage of pressure fluid to between the steel pipe and said tubes to maintain each of said tubes substantially pressure-balanced, and means for anchoring one end of each of said tubes while leaving the other end free to float, whereby the tubes may contract and expand without imparting movement to the said seat and said body.

7. Valve mechanism comprising in combination a steel pipe valve body, a steel member providing a valve seat mounted within said steel pipe and rigidly secured thereto, a guide tube for fluid within said pipe at one side of said steel member, the outer end of this tube being rigidly secured to the steel pipe, an outwardly flared tube within the steel pipe at the opposite side of the said steel member and having its outer end rigidly secured to said pipe, the inner ends of said tubes and the adjacent faces of the said steel member being so constructed and arranged that the steel member supports the inner ends of the tubes while permitting of elongation and contraction of the tubes without necessitating movement of the steel member.

OSCAR H. LUDEMAN.